June 4, 1929.  T. S. CURTIS  1,715,449
REFRACTORY COMPOSITION AND PROCESS OF MAKING SAME
Filed Dec. 11, 1924  2 Sheets-Sheet 1

INVENTOR.
Thomas S. Curtis,
BY Arthur P. Knight
ATTORNEY.

June 4, 1929.   T. S. CURTIS   1,715,449
REFRACTORY COMPOSITION AND PROCESS OF MAKING SAME
Filed Dec. 11, 1924   2 Sheets-Sheet 2
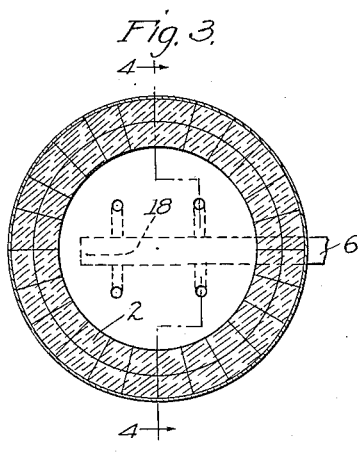
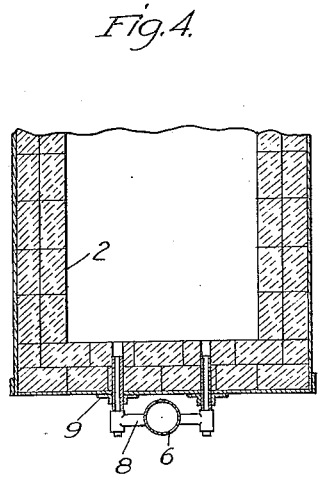
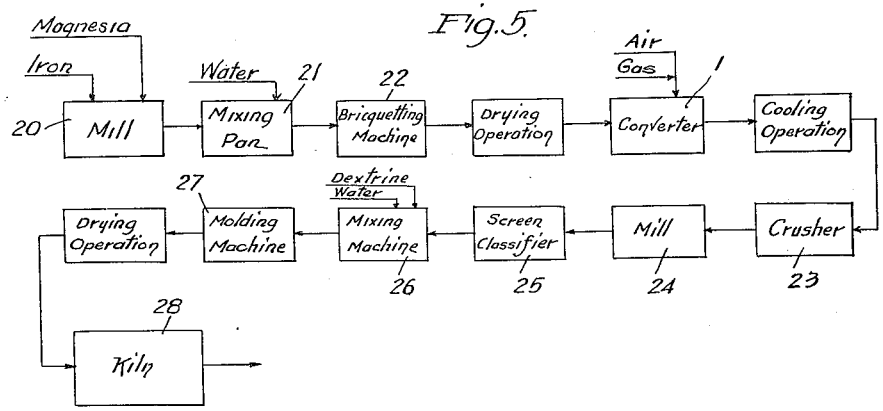
INVENTOR.
Thomas S. Curtis
BY Arthur P. Knight
ATTORNEY.

Patented June 4, 1929.

1,715,449

UNITED STATES PATENT OFFICE.

THOMAS S. CURTIS, OF HUNTINGTON PARK, CALIFORNIA, ASSIGNOR, BY MESNE ASSIGNMENTS, TO PACIFIC-SOUTHWEST TRUST & SAVINGS BANK, TRUSTEE, OF LOS ANGELES, CALIFORNIA, A CORPORATION OF CALIFORNIA.

REFRACTORY COMPOSITION AND PROCESS OF MAKING SAME.

Application filed December 11, 1924. Serial No. 755,199.

This invention relates to refractory compositions for use in forming brick or other bodies adapted for use at high temperatures and particularly for use in connection with basic slags, vapors, and dusts. The main object of the invention is to produce a refractory material which will withstand the action of such basic slags at very high temperatures without deterioration, erosion, or cracking of the material and which will possess high physical strength even at high temperatures.

Magnesium oxide or magnesia is by far the best material available in so far as resistance to the common basic slags is concerned, such slags including basic open hearth slags, slag for mineral wool, mill scale, Portland cement clinker, etc. Pure magnesia brick are exceedingly resistant to such basic slags, showing neither erosion nor cracking to any appreciable extent, whereas refractory brick composed of other materials are badly eroded and penetrated by the slag or are subject to excessive splitting and warping in the presence of the slag at high temperatures. It has been found however that the presence of comparatively small percentages of certain impurities in magnesia brick has a very deleterious effect upon the refractory and slag-resistant qualities thereof, causing a decided increase in the degree of attack. Among such harmful impurities are silica, alumina, and lime, and an important object of this invention is to eliminate in so far as possible the presence of such impurities in a magnesia brick. Iron or iron oxide on the other hand is found to be a comparatively harmless impurity especially when the proportions of the other impurities above mentioned are low and I have taken advantage of this face in my invention as will appear hereinafter.

Common magnesia refractories, however, while showing very high resistance to basic slags are subject to the serious objection of lack of physical strength. The use of magnesia brick in side walls or roofs of furnaces, etc., has largely been precluded because of inherent weakness and inability to withstand loads at high temperatures. For such purposes the less slag-resistant but physically stronger silica brick has generally been used because of its greater ability to stand the side wall and roof loads of the furnace. The comparatively low melting point of silica brick coupled with their inability to withstand the attack of basic slag has however resulted in severe losses in many furnace operations because of necessity of shutting down the furnaces for repairs. An object of this invention therefore is to produce a refractory magnesia composition which will not only possess the inherent high melting point and slag-resistance of magnesia refractories but will also withstand heavy loads at high temperatures and thus enable it to excel in every way silica or any other known refractory material.

I have found that the physical weakness of magnesia brick as heretofore produced is due to the relatively low melting point of the magma or bond in which the magnesia crystals are embedded and which serves to hold the particles of magnesia together. The softening of this bond under heat permits the granules of magnesia to slip over one another and thus seriously impairs the physical strength of the brick. I overcome this defect and accomplish the objects above referred to by using a refractory composition consisting of the product of reaction of suitable proportions of magnesia and iron oxide, or iron in the presence of oxygen, at high temperature, as hereinafter set forth.

The accompanying drawings illustrate certain apparatus and the arrangement thereof for use in connection with my invention, and referring thereto:

Fig. 3 is a horizontal section through the converter.

Fig. 4 is a vertical section through the converter on line 4—4 in Fig. 3.

Fig. 5 is a diagrammatic flow sheet showing the different stages or operations of the process used in producing my improved refractory composition and in manufacturing refractory brick therefrom.

Figure 1:
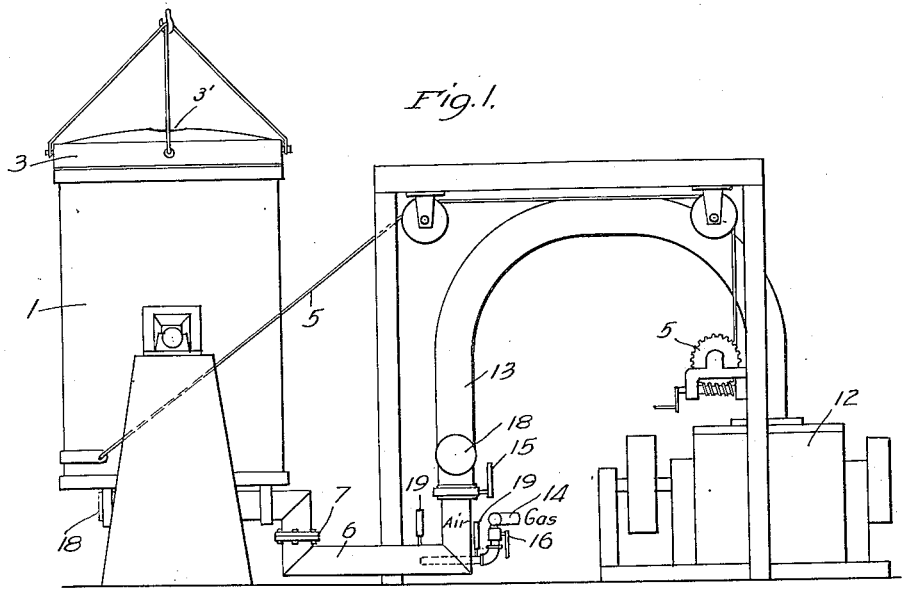
Fig. 1 is a side elevation of a converter adapted for use in preparing the refractory composition according to my invention and of certain apparatus used in connection therewith.
Figure 2:
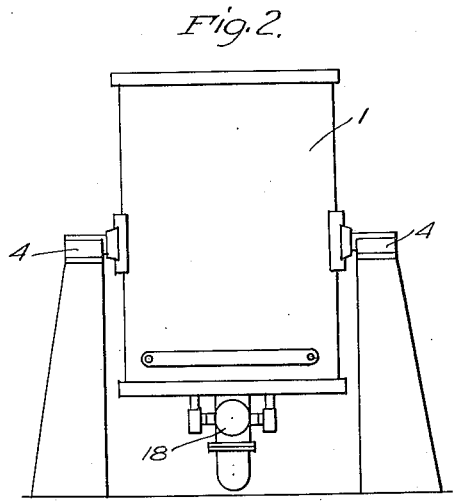
Fig. 2 is an end view of the converter shown in Fig. 1.

All of the apparatus or devices used in connection with my process are of well known construction and operation and require no detailed description here with the exception of the converter which is used for heating the mixture of iron and magnesia in the manner hereinafter described, to produce a material having the desired consistency, composition, and structure. Such converter as shown in Figs. 1 to 4 inclusive comprises preferably a vertical, cylindrical shell or casing 1 whose side and bottom walls are lined with suitable refractory or heat resistant material indicated at 2. The converter is open at its upper end to permit charging and emptying and is provided with a removable cover 3 constructed of or lined with refractory material for closing the upper end thereof during certain stages of the converter operation as hereinafter described, said cover having a suitable vent or opening 3'. Said converter is mounted to tilt in a vertical plane or horizontal axes or trunnions 4, suitable means indicated at 5 being provided for effecting such tilting operation. Supply means 6 are provided for mixing and supplying gas and air to the converter, said supply means having a detachable connection 7 adapted to be disconnected so as to permit tilting of the converter. Said supply means 6 is connected by suitable branch pipes 8 to tuyères 9 extending through the bottom of the converter and adapted to supply or introduce gas and air into the converter. Suitable means are provided for producing a supply of air under pressure, such means comprising, for example, an air compressor or blower 12 connected by pipe 13 to the supply means 6. Gas supply means indicated at 14 are also provided for introducing into said supply means 6 the supply of the fuel gas. Said air and gas supply means 13 and 14 are provided with suitable valve means indicated at 15 and 16 respectively. Suitable means such as friction plugs or caps 18 may be provided at suitable points in the air supply pipe and in the fuel and air supply means 6 for preventing dangerous explosions, such plugs or caps being fitted comparatively loosely in place and adapted to be blown out in case of explosion, thus preventing damage to any parts of the apparatus.

The other devices and apparatus used in the various stages of the process and the arrangement thereof are illustrated diagrammatically in Fig. 5. Such devices are of ordinary and well known construction and operation and do not require detailed description but will be referred to hereinafter in the description of the process.

I prefer to carry out the process of my invention in the following manner:

The raw materials required are magnesium oxide and metallic iron. I prefer to use what is known as plastic burned magnesite which in reality is magnesium oxide which has been produced by calcining magnesium carbonate to a temperature which removes all but about 1% of the carbon dioxide. This preference is due to the natural plasticity of such a form of magnesia which permits of briquetting without the addition of any additional binder. The use of plastic magnesia, therefore, has no chemical significance and I do not desire to limit myself to the use of magnesium oxide in this form. In fact, from the standpoint of the reaction I may use with equal facility raw magnesium carbonate known as magnesite or dead burned magnesia just as well as the plastic form of the oxide providing I take suitable precautions to produce a dense briquette through the addition of a temporary and preferably an organic binder such as dextrine, to insure rigidity of the briquette after charging the converter. The form of iron used is also dictated by convenience in manufacturing practice. I prefer to use cast iron borings because of the ease with which this form of iron may be ground to a fine powder. Steel borings might be used with equal facility if it were not for the difficulty of reducing them to the necessary state of subdivision.

Chemically the magnesia component must have less than 6% silicia in order to produce a merchantable product and less than 2% silica to produce a brick with the utmost load bearing ability. The limits of the other impurities in the magnesia are alumina 2% and lime 3%. Ordinarily, I prefer to use a magnesia having a magnesium oxide content of 92 to 97% in the calcined form, the remaining 8 to 3% comprising, in addition to unremoved carbon dioxide, silica, alumina, lime, iron and other impurities. The limits of impurities in the iron are; silicon less than 2%, sulphur and phosphorus less than 1%.

The raw materials comprising the charge are weighed into a unit batch and are so calculated as to give a ratio in the finished product of say, about 40 parts of $Fe_2O_3$ to 60 parts of MgO. A typical charge would be represented as 202 pounds of iron borings to 444 pounds of magnesia having a magnesium oxide content of 92%, these particular proportions corresponding to 41.25 parts of $Fe_2O_3$ to 58.75 parts of MgO. In calculating this charge, allowance is made for the increase in weight of the iron borings due to oxidation, the conversion factor employed being 0.7. That is to say, the 202 pounds of metallic iron in the charge when divided by 0.7 will bring the $Fe_2O_3$ in the charge up to 288 pounds. Likewise, in calculating the magnesia addition to the charge the conversion factor is the percentage of MgO in the ore as charged.

The charge comprising magnesia and iron borings is intimately mixed and ground to the proper degree of fineness in any suitable manner. For this purpose the ingredients may be first ground separately and then mixed but I prefer to intergrind the charge so as to effect grinding and thorough mixture at one operation. For example the magnesia and iron in proper proportions may be placed in a batch grinding ball mill 20 lined with chrome steel and having chrome steel grinding balls. The grinding of the two components is continued for a length of time sufficient to bring the entire charge down to a grain size that will pass a screen having openings of 1/40 of an inch. This usually requires approximately three and one half hours of grinding. I have found it highly advantageous to limit the fineness of grinding rather definitely in order that the tendency of the magnesium oxide to cake on the inside of the mill may be avoided. The above mentioned grain size obviates this trouble and at the same time produces a powder which may be briquetted into a very dense and strong brick.

At the completion of the grinding and mixing operation which, as will be seen, results in a thorough comminution and intimate admixture of the two components of the charge, the latter is placed in a suitable mixing pan 21 where water is added to the extent of from 15 to 20% by weight of the charge. Immediately the moistened charge is passed through a briquetting machine 22 of standard design and formed into briquettes of suitable size for example 3" thick by 4 1/2" wide by 9" long. I have found that this size of briquette charges well and permits of readily handling in storage but I do not desire to be limited to such a size or form of briquette as this is merely a matter of manufacturing convenience. An alternative method of briquetting the charge is to add from 20 to 30% water to make a stiff paste by passing the material through a pug mill or other suitable wet mixing machine and delivering the mixture in rough slugs, which, when dried will acquire great hardness and strength. I find the latter method to produce a superior density in the charge but find it rather more costly than the automatic operation previously described.

The briquettes or slugs of material formed by either of the methods above described or in any other suitable manner, are then dried, for example, by stacking in piles and allowing them to dry in the air. The use of plastic magnesium oxide promotes the generation of considerable heat in the briquettes and they are dried due to the hydration of the magnesia. Indeed, so pronounced is this evolution of heat that no external heat is required for drying to the desired hardness. The entire stack of briquettes will steam for hours and thereby liberate a considerable part of the moisture required for briquetting, without the application of artificial heat.

When thoroughly hard the briquetted charge is subjected to a converting operation whereby the ingredients are heated and caused to react and combine in such manner as to produce the desired refractory composition. For this purpose the briquettes may be raised on an elevator and dumped from a charging buggy into the throat of the converter without any regard for placement of the briquettes other than to take the precaution to insert a rod in each of the four blast tuyères 9 while charging to prevent the accidental covering of a tuyère by the first unit of the charge to be placed in the converter. As soon as the first buggy has been dumped the rods are withdrawn from the tuyère holes and charging proceeds thereafter until the converter is filled to the top. In the two and a half ton converter now being used approximately 3500 pounds of charge is required to fill the converter.

The converter operation may be divided into two principal steps. The first, which may be called the gas or ignition stage, consists in burning an explosive mixture of natural gas and air in the converter which in many respects is similar to a typical Bessemer converter as used in the steel industry. In starting the converter, gas is admitted through pipes 14 and 6, without air, and ignited at the top of the converter. As soon as free combustion is established the air valve 15 is opened until an explosive mixture is obtained which is immediately manifested by a mild explosion which extinguishes the free burning gas flame at the top of the converter and promotes the combustion without visible flame down inside the charge within the converter. The proportions of air and gas necessary for this combustion are readily calculated if the composition and B. t. u. value of the gas are known. In the case of a typical Southern California natural gas having a value of approximately 1150 B. t. u. the proportions of gas to air are as 1 to 10.7. This desired mixture may be controlled for example by means of low pressure direct reading manometers 19 which read in ounces of pressure. Air is supplied by a positive pressure blower or other means 12 operating at from 1 1/2 to 2 pounds to the square inch. Gas is delivered to the furnace at a pressure of approximately 6 pounds per square inch ahead of the control valve. The actual gas pressure registering on the gauge beyond the control valve is maintained at six ounces above the air pressure. This relation is, of course, established by the size of the air supply pipe and the orifices through which the gas passes into the mixing chamber or supply pipe 6. The relation of these openings was purposely designed to maintain constantly a higher gas pressure than air pressure at the mixing point to prevent air passing back into the gas pipe line, and thus prevent danger of explosions in the gas line. The friction caps 18 above described serve to prevent serious damage in case of explosion within the mixing chamber 6. Such explosion hazards have however virtually been eliminated by reducing the size of the tuyères 9 and increasing the velocity of the explosive mixture until the velocity was found to be greater than the rate of flame propagation.

Once the combustion has been started the operation of the converter is characterized by extreme simplicity, the fact that combustion is taking place being manifested solely by a roaring sound from within the converter. Usually for the first two or three hours of the operation no flame whatever is visible in the converter, and usually after three hours a color appears at the top of the converter and a trace of greenish, yellow flame shows above the charge. After about four hours and from that time until near the end of the first stage of the operation, a slow but continuous settling of the charge is manifested. During the remainder of this gas period, as it is called, the balance of the charge weighing approximately 1500 pounds can be added to that originally placed in the converter, due to the settling of the charge brought about by the partial fusion or softening thereof and the reaction occurring therein. During all the above stages of the operation of the converter, the removable cover 3 is left off, leaving the upper end of the converter open usually after twelve to fourteen hours of operation the portable cover 3 is placed on the converter to complete the burning of the charge at the extreme top of the vessel. The balance of the gas period, which in total comprises about nineteen hours, is then merely an operation of quiet combustion.

At the conclusion of the gas or ignition period the gas is turned off and air from the blower admitted for about two hours or longer. This stage, which I call the blasting or air period, has much to do with the quality of the finished product. During the period of air blast the operation is characterized first of all by a distinct rise in temperature and a very noticeable settling of the furnace charge. This, I believe to be due to the immense quantity of heat liberated by the oxidation of the iron, which up to this point has been maintained largely or partially in the metallic state, or possibly in the FeO state, due to the non-oxidizing condition in the converter. It is apparently chiefly during the blasting period that the final conversion into the desired compound takes place as I have found this conversion to be far less complete when the air blast period is eliminated. The maximum temperature reached in the converter operation is cone 40 or about 3506° F, at which temperature the ingredients are partially fritted or sintered, or brought to a state of incipient fusion.

The converter may be tilted by means 5 immediately the air blast period has been completed, which is at the twenty-first hour of the furnace operation provided the above described schedule is followed. While the charge is still white hot it may be removed from the tilted vessel by barring down with tools familiar to every steel mill operator. The drawing operation usually requires from one to two hours while the recharging is accomplished in about one half hour. The converter thus makes one complete cycle in about twenty four hours and delivers in finished product an average of 5000 pounds of material.

The product delivered by the converter has a specific gravity of about 3.99 to 4.0 and is highly refractory. It has a brownish red color, and a finely crystalline, somewhat strong structure which can be immediately recognized without the aid of a microscope by those experienced in the art. It may be reduced to any desired state of division and used for any purpose for which refractory materials are or may be used.

A particularly advantageous application of my refractory composition is in the manufacture of refractory brick. For this purpose the product, after cooling is reduced to the desired state of division in any suitable manner, for example it may be passed through a jaw crusher 23 and ball mill 24 and thence over screens or classifiers 25 which divide it into grain sizes preferably in the following proportions:

| 8–20 | Mesh | 37% |
| 20–100 | Mesh | 30% |
| 100–fines | | 33% |

The grain in the proportions as above outlined is weighed into a mixing machine 26 and mixed with a suitable temporary binding agent, such as finely powdered dextrine to the extent of one part of dextrine to one hundred parts of grain. Four parts of water to one hundred parts of grain is added to the mix which is stirred and turned to promote a thorough blending of the various grains. The actual procedure in mixing is important. I find it desirable to add the water to the coarse and medium grains coating them thoroughly with the desired moisture content before adding the fines and the dextrine. This procedure results in the coating of every coarse grain with a thin moist film of the fine material whereas if the procedure as outlined is not followed the moisture has a tendency to form a union with the fine grains only, consolidating the fines to balls and utterly destroying the molding quality of the mixture.

The molding batch as described is then charged into steel molds or wooden molds steel lined of the knock down type. Charging is done by weight to insure uniform density. The mold is then subjected to pressure by any suitable means such as a hydraulic or a mechanically operated screw press or other molding machine 27 which delivers a firm and positive stroke, the pressure resulting from which may equal a value of from 500 pounds to 5000 pounds per square inch. I have found it possible, also, to employ the standard type of mechanical brick-making press in the manufacture of the standard series of 9″ shapes as used by the refractories industry.

After pressing, the brick are dried as rapidly as desired and immediately placed in the kilns 28 for firing. In the latter operation I prefer to use a kiln of the railroad tunnel type in order that close control may be exercised over the rate of firing and in order that a very high firing temperature may be maintained. In the tunnel kiln which I have used the firing temperature is maintained at a minimum of ceramic cone 20 or 2786° F. and a maximum of ceramic cone 26 or 3002° F., the firing cycle being ninety six hours from the time the car enters the kiln to the time it leaves. The actual firing time at the highest temperature is twenty four hours at full heat.

In firing refractory brick formed of my composition, I find it desirable to provide ample oxidation periods in order to bring any unoxidized iron or ferrous oxide in the composition to the ferric oxide state, at least through the major portion of the brick if not completely so. I also find it necessary to fire sufficiently long and at sufficiently high temperature to bring about a recrystallization of the brick structure which practically obliterates the original grain from which the brick was made.

My refractory composition is not only adapted for making refractory brick but may be employed for any other purpose for which such materials are adapted, for example, it may be used for linings or sintered bottoms of furnaces or hearths. For this purpose the ground material containing suitable proportions of grain sizes best adapted for this purpose may be spread in a thin layer upon the bottom of the hearth to be lined and the hearth may then be fired to a sufficient temperature to sinter together such layer of refractory material. Another thin layer may then be placed and fired and this operation may be repeated until a refractory lining of the desired thickness is obtained. In addition to the above described uses the refractory composition may be used for many other purposes for example in the manufacture of refractory tubing or other shapes, it being understood that in any case the grain sizes and the proportions thereof may be so selected as to give the desired consistency during fabrication and the desired structure in the final product.

The above description of the process of making my refractory composition sets forth definite and exact proportions, grain size, etc., which have been found to produce in general the highest grade product. While I therefore prefer to use substantially the proportions and follow the procedure set forth above I do not wish to be limited to these exact conditions. For example the proportions of iron and magnesia are not necessarily such as to give a ratio in the finished product of about 40 parts of $Fe_2O_3$ to 60 parts of MgO as this ratio of $Fe_2O_3$ to MgO may be varied between the limits of 10 to 90 and 70 to 30 without departing from the spirit of the invention. I, however prefer, for the sake of quality of product, to use such proportions of iron and magnesia as to give a calculated ratio of $Fe_2O_3$ to MgO of between 20 to 80 and 50 to 50, as the material containing these proportions has greater refractoriness and strength than when the proportions are varied beyond these limits. I have also found that the composition or product obtained when the ratio of $Fe_2O_3$ to MgO is approximately 40 to 60 is generally superior to that obtained when any other substantially different proportions are used. The fineness of grinding of the mixed charge was stated to be 1/40 of an inch, but while this grain size has certain advantages, I do not wish to be limited thereby, as grinding to any suitable mesh for briquetting and for facilitating the converter operation will answer the purpose. Nor do I wish to be limited to the exact proportion of water used in briquetting nor to any particular method of briquetting. Any means and manner of operation whereby the ground charge may be formed into compact shapes for charging into the converter may be employed for this purpose.

As to the converter operation there are certain factors which must be observed for example I have found it highly advantageous to obtain the heat by combustion of an explosive mixture in direct contact with the charge so as to obtain a maximum heating effect. I do not wish to be limited to any particular temperature and time of firing, but the temperature must be sufficient during the gas or ignition period to bring the ingredients to a state of incipient fusion and to cause oxidation of the iron to proceed with the resultant evolution of further heat when the gas supply is cut off during the latter stage of the operation. The duration of the ignition period must be sufficient to bring the entire charge to substantially the same temperature and probably cause partial reaction or combination of the ingredients so as to produce a uniform product. The temperature reached during the latter or blasting stage of the converter operation is controlled by the oxidation of the iron in the charge, and is therefore dependent to some extent on the percentage of iron, but primarily upon the temperature within the entire charge at the end of the ignition period. The duration of the blasting period should be sufficient to bring substantially all of the iron into the oxidized state and to permit reaction, at the existing temperature, between the solid constituents. Under these conditions combination takes place between the iron oxide and the magnesia, resulting in the production of a highly refractory material possessing great physical strength.

I do not wish to limit myself by positively defining the structure of my refractory material. It comprises a mixture of ferric oxide and magnesia and of compounds containing both ferric oxide and magnesia in combination, the total amounts of these two ingredients being in the proportions above mentioned. Furthermore, I believe that substantially all of the ferric oxide is combined with the magnesia in some way. Whether the combination of iron oxide with magnesia is uniform throughout the mass, or whether a plurality of such compounds exist, I am not at present able to state with certainty. Moreover, I am not able to state with certainty whether the combinations or compounds present are able to assume more than one crystalline form or modification. It is probable, however, that the final product consists of crystals of periclase or other stable form of magnesia, developed and contained in a magma of magnesioferrite or other compounds of iron oxide and magnesia. In this case the latter material serves as a very strong and difficultly fusible bond between the particles or crystals of magnesia.

In my investigations of the resistance of various refractories to basic slags and of their strengths at high temperatures, I have found that the same impurities which decrease the resistance of magnesia brick to basic slags have still greater effects upon the ability of the brick to bear loads at high temperatures and it was therefore deemed very desirable to eliminate such impurities from the composition of the brick as far as possible. The presence of silica in the magnesia brick even in very small proportions was found to be especially detrimental to the strength of the brick, and brick composed of what is generally considered practically pure magnesia but actually containing small amounts of silica were found to shear off under load at approximately the same temperatures as those containing say two per cent or more silica. The cause of this was further investigated and microscopic examination showed that the bond between the granules of magnesia was the same in the nearly pure brick as in the two per cent silica brick, that is the bond consisted of a magnesium silicate glass which becomes pasty at approximately ceramic cone 20 or 2786° F. and liquid at a few degrees above that temperature. As this glass melts it permits the granules of which the brick is composed to slip over each other and thus accounts for the shearing off of the brick under load at high temperatures. This objectionable weakness can not however be satisfactorily overcome merely by substantially eliminating the silica, as it has been found that if an attempt is made to form a brick of pure magnesia containing less than 1/2% of silica it is impossible to reach a sufficiently high temperature in a commercial furnace to sinter the grains of pure magnesia together and form an effective bond.

As a result of these investigations it became apparent that in order to obtain a magnesia brick of high strength it would be necessary to use some other bond than the magnesium silicate glass. Neither silicates nor aluminates are suitable for this purpose because of the low melting point of the former and of the effect of small silica percentages in lowering the melting point of the latter. As stated above, iron is one of the few impurities which was found to have little if any harmful effect upon magnesia brick from the standpoint of slag-resistance. I have also found that brick made of a synthetic composition of approximately 80% iron oxide and 20% magnesia, corresponding substantially to the proportions of such materials in magnesioferrite, were very refractory and melted into a paste rather than a slag at temperatures under 3200° F., no decided softening being observed below 3000° F. This discovery suggested the possibility of using very high iron compositions as a magma in which to grow crystals of periclase which is the stable form of magnesia, so that such periclase crystals would interlock in the presence of a bond of difficultly fusible material and the brick would thus retain its strength at high temperatures. I am aware that for many years the use of iron up to 8% was considered very desirable in magnesia refractories but I have seen many statements in the literature to the effect that higher percentages than this seriously reduced the melting point of the composition and therefore weakened the brick. I have found however that the lowering of the melting point and the resultant weakening of the brick at high temperatures should not be attributed to the presence of increased iron content alone but that the damage was caused by the presence of silica and alumina along with the iron.

It was found that by keeping the silica content low, and preferably below 2% and also keeping the alumina and lime content low, comparatively high percentages of iron could be used in the composition resulting in an increase in strength rather than a decrease. Tests have been made using compositions containing from approximately three per cent iron oxide to fifty per cent or more, and I have found that an especially good brick may be made if the percentage of iron oxide is between thirty-five per cent and fifty per cent and the silica-alumina-lime content is low. Brick of this kind containing approximately forty per cent iron oxide were found to be especially desirable. Such bricks were tested at high temperatures and under load and were found to be decidedly superior to the ordinary commercial magnesia brick and to silica brick as well as to forms of refractory brick now on the market, not only as to resistance to slag but in regard to physical strength and resistance to high temperature as well. The superior strength, under heat, of the product containing between 35 and 50 per cent of iron oxide, and particularly that containing about 40 per cent iron oxide in the mass, I consider to be due to the fact that the use of these proportions provides a magma of iron oxide-magnesia compounds (probably magnesioferrite) which is just sufficient to enclose each separate crystal of magnesia and to separate it from adjacent crystals, without forming any appreciable lumps or large bodies of such magma. In this manner each crystal of magnesia is enclosed in a thin coating of iron oxide-magnesia magma, which binds it strongly to adjacent crystals, while at the same time undue slipping between crystals, due to softening of the magma at high temperatures is avoided. In addition to producing a refractory composition of the above proportions I have devised, by experiment and large scale operation, the above-described complete and somewhat detailed process of manufacture by which refractory materials of this composition and of a high degree of uniformity, strength, and resistance to basic slags and high temperatures may be economically produced, and my invention consists not only in the composition or material but in the improved process by which this composition is produced.

Refractory brick or other bodies consisting entirely of grain composed of my improved refractory composition are most desirable for many purposes. In some cases, however, it may be permissible or even preferable to mix with such grain suitable proportions of other material, for example magnesia preferably in the form of periclase, the procedure being in such case to thoroughly mix the grain of my composition with the other material and then mold or otherwise form the mixture to the desired shape and burn or fire so as to form bricks, linings, or other refractory bodies as set forth above. In case magnesia is added in this manner the proportion of ferric oxide in the final brick or other body will be less than in the refractory composition of my invention used as one constituent thereof, and such proportion of ferric oxide in the final product may be as low as 10% or less.

What I claim is:

1. A refractory composition consisting of the reaction product of a mixture of magnesia and iron oxide containing not less than 35% and not more than 50% of iron oxide, and said mixture having been heated to a sufficiently high temperature to cause reaction between the magnesia and iron oxide and sintering of the product.

2. A refractory composition consisting of magnesia and iron oxide and containing not less than 35% and not more than 50% of iron oxide.

3. A refractory composition consisting of the reaction sintered product of a mixture of about 40% of iron oxide and about 60% of magnesia which has been heated to a temperature of about 3500° F.

In testimony whereof I have hereunto subscribed my name this 6 day of December, 1924.

THOMAS S. CURTIS.